(12) United States Patent
Hubbart

(10) Patent No.: US 6,862,904 B1
(45) Date of Patent: Mar. 8, 2005

(54) PINTLE HITCH PROTECTIVE LOCK ASSEMBLY

(76) Inventor: James R. Hubbart, 4528 Miramar Northeast, Grand Rapids, MI (US) 49525

( * ) Notice: Subject to any disclaimer, the term of this patent is extended or adjusted under 35 U.S.C. 154(b) by 0 days.

(21) Appl. No.: 10/375,074

(22) Filed: Feb. 28, 2003

(51) Int. Cl.$^7$ .............................................. E05B 73/00
(52) U.S. Cl. ................... 70/14; 70/56; 70/232; 70/258; 280/507
(58) Field of Search ............................ 70/14, 54–56, 70/229, 232, 259, 417, 258; 280/507

(56) References Cited

U.S. PATENT DOCUMENTS

| | | | |
|---|---|---|---|
| 4,186,575 A | 2/1980 | Bulle | 70/14 |
| 4,376,544 A * | 3/1983 | Sette et al. | 280/507 |
| 4,380,160 A | 4/1983 | Hoffman | 70/14 |
| 4,480,450 A | 11/1984 | Brown | 70/14 |
| 5,332,251 A | 7/1994 | Farquhar | 280/507 |
| 5,343,720 A | 9/1994 | Slater | 70/14 |
| D. 417,133 S | 11/1999 | Niswanger | D8/331 |
| 6,467,317 B1 * | 10/2002 | Hillabush et al. | 70/56 |
| 6,598,432 B1 * | 7/2003 | Dwyer | 70/14 |

FOREIGN PATENT DOCUMENTS

| | | |
|---|---|---|
| GB | 2245534 | 1/1992 |
| FR | 2668738 | 5/1992 |

* cited by examiner

Primary Examiner—Suzanne Dino Barrett
(74) Attorney, Agent, or Firm—Dowell & Dowell, P.C.

(57) ABSTRACT

A protective lock assembly for preventing unauthorized access to a pintle receiving hitch which assembly includes opposing plate members which are mounted on opposite surfaces of the hitch and wherein a tongue carried by one plate member is engageable by a lock whose shackle is protectively seated within a housing which extends from the other plate member.

7 Claims, 2 Drawing Sheets

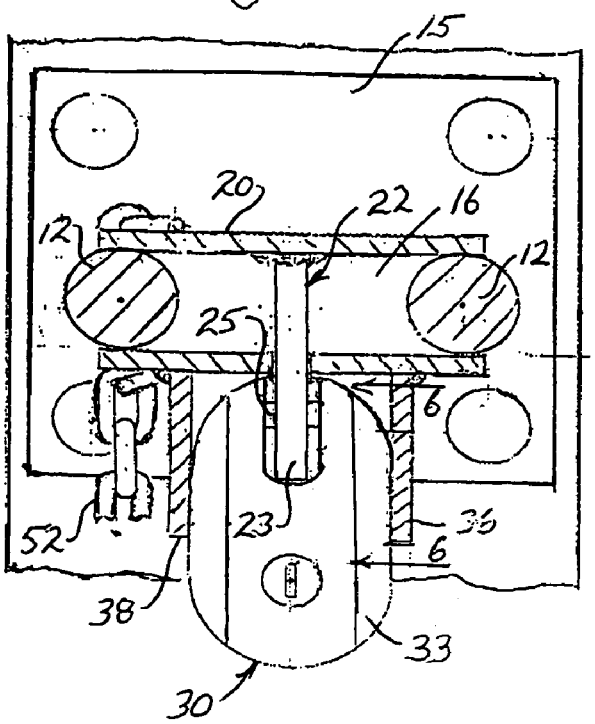
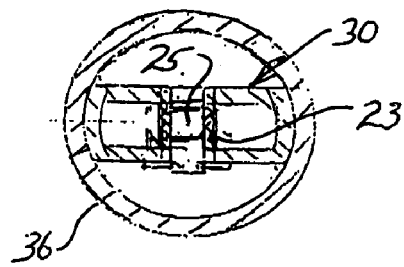
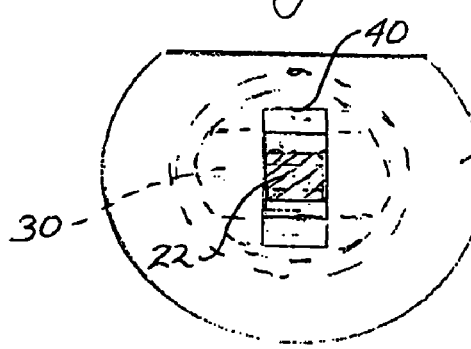
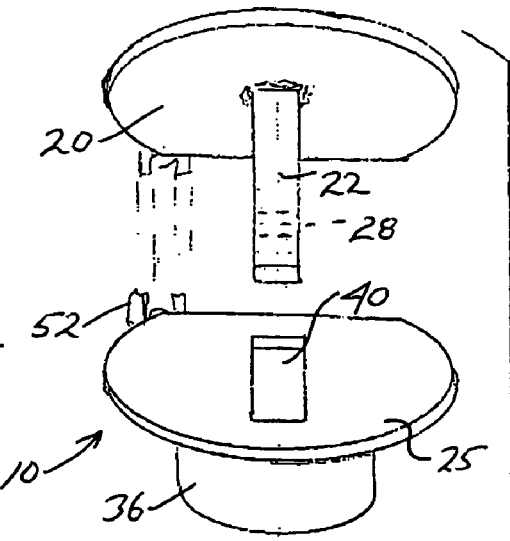
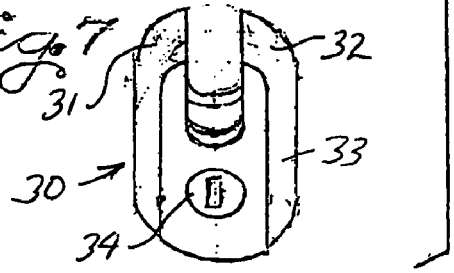

PINTLE HITCH PROTECTIVE LOCK ASSEMBLY

BACKGROUND OF THE INVENTION

1. Field of the Invention

This invention is generally directed to devices for use in preventing unauthorized access to hitches of the type which are used to receive a pintle of a towing vehicle and which are often associated with heavy duty trailer type equipment used in construction and in maintenance. More particularly, the present invention is directed to a protective device which functions to seal off a hitch ring of a trailer device so that it can not be towed by unauthorized personnel and wherein the device is locked to the hitch ring in such a manner that unauthorized tampering of the lock, shackle or bolt is prevented.

2. Description of the Related Art

Equipment used in the construction and maintenance industry is frequently mounted on a trailer to promote portability. Many such heavy duty type trailers utilizing a hitch which is adapted to be mounted to a tongue of a towing vehicle by way of a pintle which extends through an opening in a circular ring or hook type device defined by the hitch.

It is often not possible to leave or store such trailers or trailer mounted equipment in secured areas. Often, it is necessary that such equipment and trailers be left on site and, unfortunately, such equipment and trailers are subject to misappropriation or theft.

In an effort to deter the unauthorized use or theft of such trailers and equipment, there have been a number of innovations directed to devices for securing such trailers and equipment by preventing the use of the hitch assemblies associated therewith. By way of example, heavy duty chains are often passed through a hitch rings and locked upon themselves in order to obstruct the opening through the hitch rings. Unfortunately, such chains and the locks used to secure them are subject to tampering using bolt cutters and other devices.

Other protective devices include assemblies which are designed to be mounted within a hitch ring and secured utilizing conventional locks. However, in many such assemblies, the lock bolt or lock shackle may be easily accessed so that the shackle or bolt can be tampered with utilizing bolt cutters or other tools.

Some examples of prior art type protective devices for pintle hitch assemblies are disclosed in U.S. Pat. No. 4,186,575 to Bulle; U.S. Pat. No. 5,343,720 to Slater; U.S. Pat. No. 4,480,450 to Brown; U.S. Pat. No. 5,332,251 to Farquhar; and U.S. Pat. No. 4,380,160 to Hoffman.

In view of the foregoing, there remains a need to provide for a protective device which may be secured to a hitch adapted for use with the pintle of a towing vehicle wherein the assembly provides a secure housing for a lock such that the lock can not be tampered with utilizing bolt cutters and other tools which could be used to otherwise circumvent the protective device.

SUMMARY OF THE INVENTION

The present invention is directed to a protective lock assembly for preventing unauthorized access to a pintle receiving hitch associated with a trailer type vehicle or trailer mounted equipment wherein the assembly includes a pair of opposing plates of a size to engage over the upper and lower surfaces of the hitch when in use to thereby block access to the opening in the hitch. One of the plates of the assembly includes a projecting tongue of a length to extend through the hitch and through an opening in the other plate. The other plate includes a housing which extends remotely from the hitch and which surrounds an end portion of the tongue when the two plates are placed into opposing relationship on the upper and lower surfaces of the hitch.

The housing is of a sufficient length such that when the two plates are mounted to the hitch that the tongue of the one plate remains encircled by the housing. The tongue further includes structure for cooperatively receiving a shackle or bolt of a conventional lock which is inserted within the housing and thereafter closed into engagement with the tongue to thereby prevent the separation of the two plates relative to the hitch. Further, the structure of the housing fully surrounds and thereby conceals the shackle or lock bolt associated with the conventional lock thus preventing access thereto when the plates are locked into assembled relationship.

In a preferred embodiment of the invention, the shackle or bolt of the conventional lock is received in at least one opening provided in an end portion of the tongue.

In accordance with a further embodiment of the invention, to facilitate handling of the protective device of the present invention, the two plate components are preferably flexibly jointed such as by a length of chain or cable to thereby prevent the accidental displacement of the two components but also permitting the components to be maneuvered so as to be brought into a locked relationship with a hitch as described above.

It is the primary object of the present invention to provide a protective device for use with pintle type hitches wherein the device seats within a hitch ring and can not be removed therefrom due to the engagement of a shackle of a lock with a component of the device and which component is encircled in a protective manner within the device so that tampering with the lock shackle or lock bar is not possible.

It is yet a further object of the present invention to provide a very secure, sturdy and low cost protective device for deterring theft of trailers and trailer mounted equipment wherein the device can be secured to the hitch of the trailer or trailer mounted equipment in such a manner that a lock used to secure the device in place can not be tampered with utilizing bolt cutters or other tools.

BRIEF DESCRIPTION OF THE DRAWINGS

A better understanding of the invention will be had with respect to the accompanying drawings wherein:

FIG. 3 is a cross-sectional view taken along line 3—3 of FIG. 1;

FIG. 4 is a cross-sectional view taken along line 4—4 of FIG. 2;

FIG. 5 is a cross-sectional view taken along line 5—5 of FIG. 2;

FIG. 6 is a partial cross-sectional view taken along line 6—6 of FIG. 3; and

FIG. 7 is an assembly view of the protective lock assembly of the present invention showing a specialized lock associated therewith.

DESCRIPTION OF THE PREFERRED EMBODIMENT

Figure 1:
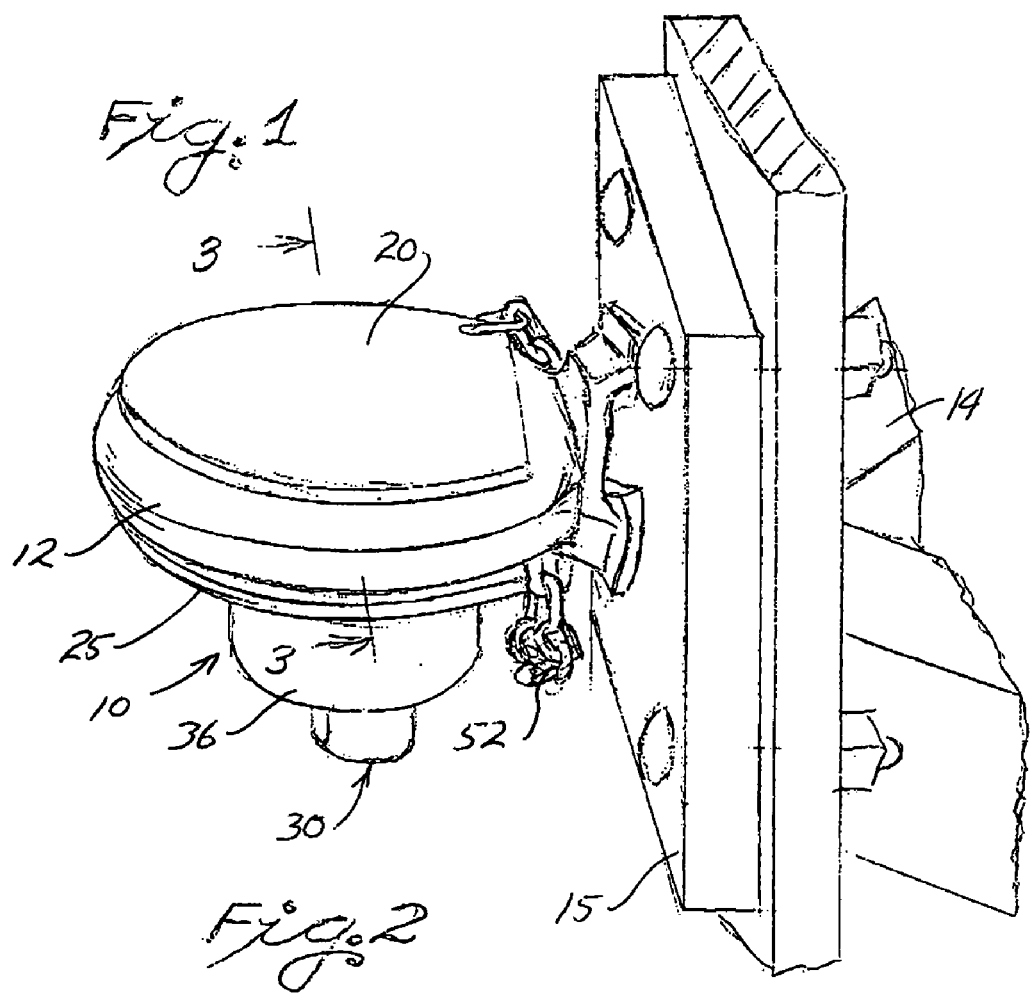
FIG. 1 is a perspective illustrational view showing the protective lock assembly of the present invention mounted within a hitch ring extending from a tongue of a trailer.

With continued reference to the drawing figures, the protective lock assembly 10 of the present invention is shown in FIG. 1 as being mounted within a hitch 12 of a trailer (not shown). The hitch is shown as being mounted to the front of the trailer tongue 14 on mounting plates 15. The hitch is in the form of a ring having an opening 16 therethrough, as shown in FIG. 3. The ring is of a size to receive a pintle associated with the hitch assembly of a towing vehicle (not shown).

Figure 2:
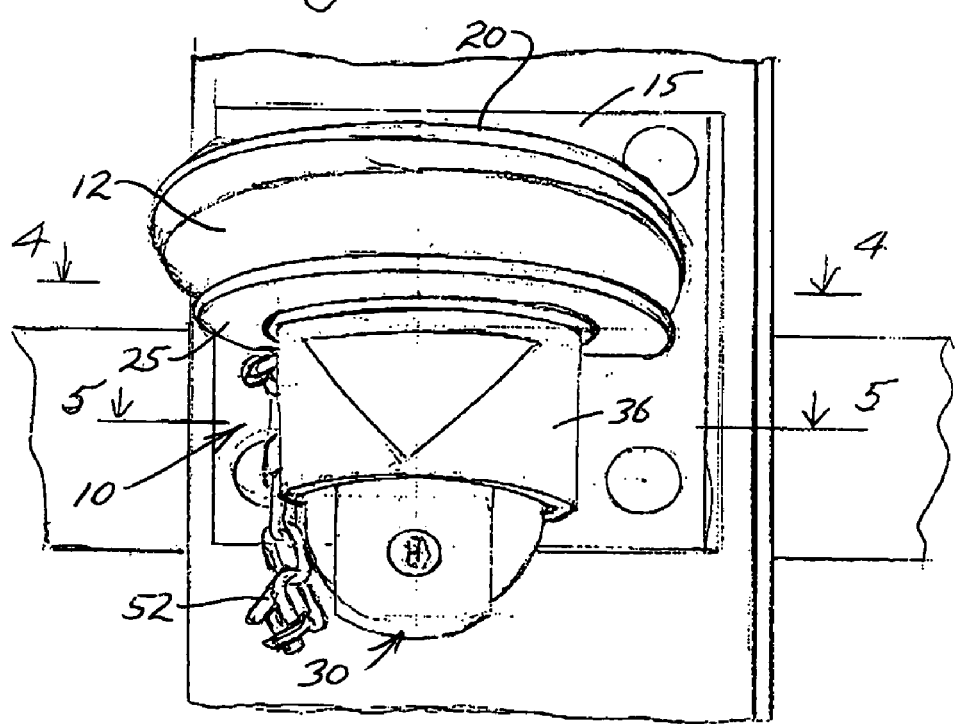
FIG. 2 is a front elevational view of the protective lock assembly as shown in FIG. 1.

The protective lock assembly 10 includes a first plate 20 of a size to be seated along either the upper or lower surface of the hitch ring as is shown in FIGS. 1-3. In the drawing figures, the plate 20 is shown as being seated on the upper surface of the hitch ring, however, the structure of the present invention also permits the plate 20 to engage the lower surface of the ring. Extending from the plate 20 is a post or tongue 22 which extends from the plate at a given distance as will be described in greater detail.

Along the outer end portion 23 of the tongue is provided a means for allowing engagement of a shackle 25 or lock bolt of a lock 30. In the preferred embodiment as shown in the drawing figures, the means for allowing the engagement is at least one opening 28 provided in the outer end portion of the tongue which opening is of a size to receive the shackle associated with the lock 30. As opposed to the opening, one or more laterally extending pins could be used to provide surfaces for engaging the shackle.

The protective lock assembly 10 further includes a second plate 35 also of a size to cover the upper or lower surface of the hitch ring. Again, although the plate 35 is showing engaging the lower surface of the hitch ring in the drawing figures, the structure of the present invention also permits the plate to engage the upper surface of the hitch ring.

Extending from the plate 35 is a housing 36 which is welded or otherwise secured generally concentrically with respect to a center of the plate 35. The housing extends to a outer open and free end 38.

In the embodiment shown in the drawing figures, the housing is generally cylindrical, however, other configurations may be used provided that the housing 36 defines walls which completely surround the tongue 22 when the tongue is inserted within the housing.

In order to permit the tongue 22 to be inserted within the housing 36, an opening 40 is provided through the plate 35. The opening 40 need only be large enough to permit the tongue 22 to be inserted therethrough.

The tongue 22 is of sufficient length such that when the plate 20 is mounted to either the upper or lower surface of the hitch ring, the end portion of the tongue extends through the opening 40 and into the housing 36. Further, the opening 28 in the tongue 22 is surrounded by the housing 36, as is shown in FIG. 3, when the lock assembly is in use. Because of the positioning of the opening 28 within the housing, it is necessary that the lock 30 be inserted within the open end portion 38 of the housing 36 until such time as the shackle 25 associated with the lock can be closed through the opening 32. Once closed, the shackle is completed surrounded by the housing 36 such that no portion thereof can be tampered with utilizing tools such as chisels or bolt cutters. In this manner, unauthorized removal of the protective lock assembly is effectively prevented.

In the preferred embodiment of the invention as shown in FIG. 7, the lock 30 is a specially designed lock referenced in the industry as the NT Shrouded Padlock, titanium series, by Master Lock®. This type of lock has the shackle 25 protected by spaced and extended arm portions 31 and 32 of the lock housing 33. In this manner, the housing 33 of the lock provides further protection for the shackle by obstructing access into the housing 36 of the protective lock assembly 10. As shown, a key slot 34 is provided for operating the shackle 25 and the slot is spaced from the housing 36 when the lock 30 is in use.

In the preferred embodiment shown, the housing 30 is generally of a diameter which permits the lock housing to be slidingly received therein while minimizing any free space between the housing of the lock and the housing 36 of the protective lock assembly. Again, this close fit between the lock housing and the protective lock assembly housing prevents unauthorized tampering with the lock shackle.

It should be noted that in the present description that the term shackle is referenced as being the member of the lock 30 which extends through the opening in the tongue 22 to secure the tongue in place. However, it is possible that the lock could be used with a sliding or deadbolt type mechanism as well and, therefore, such mechanisms should be considered within the meaning of "shackle" for purposes of definition and for purposes of the following claims.

In some embodiments, to facilitate the alignment of the shackle 25 of the lock 30 with the at least one opening 28 of the tongue 22, the opening 28 is provided at a point along the tongue such that when the lock 30 is inserted within the housing 36 with the ends of the arm portions 31 and 32 engaging the plate 35, the shackle 25 is aligned with the opening. Further, with this association of components, the plates 20 and 25 will be locked in tightly seated contact on opposite surfaces of the hitch ring thus providing additional security.

To prevent accidental separation of the plate 20 and the plate 35, in the preferred embodiment, the two components are tethered to one another such as by utilizing a chain 52 which is welded along the peripheral edge of each of the plates. The length of chain should be sufficient to permit the two plates to be readily maneuvered so that they may be brought into assembled relationship on opposite surfaces of the hitch as is shown in FIG. 1. As opposed to the chain shown, secure wires, cables or other components may be used.

The components of the protective lock assembly of the present invention preferably formed of steel plate to further deter tampering.

The tongue 22 may include two or more spaced openings or other means for allowing engagement with the shackle 25 of the lock 30. This could be necessary in allowing the protective lock assembly to be used with hitch rings of differing thickness.

In use, to secure the hitch of a trailer or trailer mounted equipment, the plate 20 is positioned either on the upper or lower surface of the hitch ring with the tongue 22 extending through the opening in the ring. Thereafter, the plate 35 is aligned such that the tongue 22 passes through the opening 40 therein and the plate 35 seated on the opposing surface of the ring. With the plates engaging the upper and lower surfaces of the ring, the lock mechanism 30 is inserted within the open end of the housing 36 and the shackle or locking bar associated therewith is activated such as by the use of a conventional key to thereby engage the shackle through the opening 28 in the tongue and thereby prevent disassemble of the plates 20 and 35.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A protective device for a pintle receiving hitch, the device including a first plate adapted to be seated on an upper or lower surface of a pintle receiving hitch so as to cover an opening through the hitch and from which extends a tongue, a second plate adapted to be seated on an opposing upper or lower surface of the pintle receiving hitch so as to cover the opening through the hitch and having an opening therethrough of the size to permit said tongue to extend therethrough, a generally cylindrical housing fixedly mounted to said second plate and being axially aligned with said opening in said second plate and having an outer open end, said tongue being of a length so as to extend through the pintle receiving hitch and having an outer end portion which projects beyond said second plate and into said housing when said first and second plates are mounted on opposite upper and lower surfaces of the pintle receiving hitch, said end portion of said tongue including means for receiving a shackle member of a lock, and said housing being of a size such that the lock is movable only generally axially relative to said housing and said means for receiving a shackle member is positioned within and surrounded by said housing and spaced from said open end thereof when said first and second plates are assembled to one another on opposite upper and lower surfaces of the pintle receiving hitch whereby the shackle member of the lock is fully concealed within said housing by a body of the lock and can not thereby be tampered with to remove the protective device from engagement with the pintle receiving hitch when the shackle of the lock is secured to said tongue.

2. The protective device of claim 1 wherein said means for receiving a shackle member includes at least one opening through said end portion of said tongue.

3. The protective device of claim 2 including connecting means for connecting said first and second plates to one another.

4. The protective device of claim 3 wherein said connecting means is a chain.

5. The protective device of claim 1 including connecting means for connecting said first and second plates to one another.

6. A protective device for a pintle receiving hitch, the device including a lock having a shackle member adjacent one end thereof and a body, a first plate adapted to be seated on an upper or lower surface of a pintle receiving hitch so as to cover an opening through the hitch and from which extends a tongue, a second plate adapted to be seated on an opposing upper or lower surface of the pintle receiving hitch so as to cover the opening through the hitch and having an opening therethrough of the size to permit said tongue to extend therethrough, a generally cylindrical housing fixedly mounted to said second plate and being axially aligned with said opening in said second plate and having an outer open end, said tongue being of a length so as to extend through the pintle receiving hitch and having an outer end portion which projects beyond said second plate and into said housing when said first and second plates are mounted on opposite upper and lower surfaces of the pintle receiving hitch, said end portion of said tongue including means for receiving said shackle member of said lock, and said housing being of a size such that said lock is moveable only generally axially relative to said housing and such that said body of said lock is restrained from lateral movement by said housing and said means for receiving said shackle member is positioned within and surrounded by said housing and spaced from said open end thereof when said first and second plates are assembled to one another on opposite upper and lower surfaces of the pintle receiving hitch whereby said shackle member of a lock is fully concealed within said housing by said body of said lock and can not thereby be tampered with to remove the protective device from engagement with the pintle receiving hitch when the shackle of the lock is secured to said tongue.

7. The protective device of claim 6 wherein said means for receiving a shackle member includes at least one opening through said end portion of said tongue.

* * * * *